(12) United States Patent
Lin

(10) Patent No.: US 9,914,335 B1
(45) Date of Patent: Mar. 13, 2018

(54) SHOCK ABSORBER

(71) Applicant: JIHSHYH INTERNATIONAL CO., LTD., Taichung (TW)

(72) Inventor: Wei-Li Lin, Taichung (TW)

(73) Assignee: JIHSHYH INTERNATIONAL CO., LTD., Taichung (TW)

( * ) Notice: Subject to any disclaimer, the term of this patent is extended or adjusted under 35 U.S.C. 154(b) by 0 days.

(21) Appl. No.: 15/265,529

(22) Filed: Sep. 14, 2016

(51) Int. Cl.
*B60G 15/06* (2006.01)
*F16F 13/00* (2006.01)
*B60G 17/02* (2006.01)
*B60G 17/08* (2006.01)

(52) U.S. Cl.
CPC ......... *B60G 15/063* (2013.01); *B60G 17/021* (2013.01); *B60G 17/08* (2013.01); *F16F 13/007* (2013.01); *B60G 2204/1242* (2013.01); *B60G 2206/41* (2013.01); *B60G 2206/42* (2013.01)

(58) Field of Classification Search
CPC .... B60G 15/063; B60G 17/021; B60G 17/08; B60G 2204/1242; B60G 2206/41; B60G 2206/42; F16F 13/007
USPC ......... 188/322.19, 321.11; 280/6.167, 6.159, 280/124.162
See application file for complete search history.

(56) References Cited

U.S. PATENT DOCUMENTS

| | | | | |
|---|---|---|---|---|
| 5,044,614 A | * | 9/1991 | Rau ...................... | B60G 15/062 267/175 |
| 6,827,184 B1 | * | 12/2004 | Lin ........................ | B60G 11/15 188/321.11 |
| 8,070,171 B2 | * | 12/2011 | Wohlfarth ............ | B60G 15/063 188/322.19 |
| 8,702,075 B1 | * | 4/2014 | Moorefield .......... | B60G 17/021 267/175 |
| 9,140,325 B2 | * | 9/2015 | Cox ..................... | B60G 15/063 |

FOREIGN PATENT DOCUMENTS

| | | | | |
|---|---|---|---|---|
| JP | 2002070917 A | * | 3/2002 | ........... B60G 15/063 |
| JP | 2002081484 A | * | 3/2002 | ........... B60G 15/063 |
| JP | 2002081485 A | * | 3/2002 | |
| TW | M392765 U | | 11/2010 | |

* cited by examiner

*Primary Examiner* — Thomas J Williams
*Assistant Examiner* — Mariano Sy
(74) *Attorney, Agent, or Firm* — Muncy, Geissler, Olds & Lowe, P.C.

(57) ABSTRACT

A shock absorber is provided, including a base, a first axial tube, a second axial tube, a buffering structure and an abutting assembly. The base defines an axial direction, and the base has a through hole radially. An exterior circumferential wall of the first axial tube has a recess formed radially and near a first end of the base, and the first axial tube is screwed with the base. The abutting assembly includes an abutting member and an elastic abutting member, the abutting member is disposed within the through hole, the elastic abutting member is disposed on the base and at least partly located in the through hole so as to abut the abutting member to move toward the base normally.

10 Claims, 6 Drawing Sheets

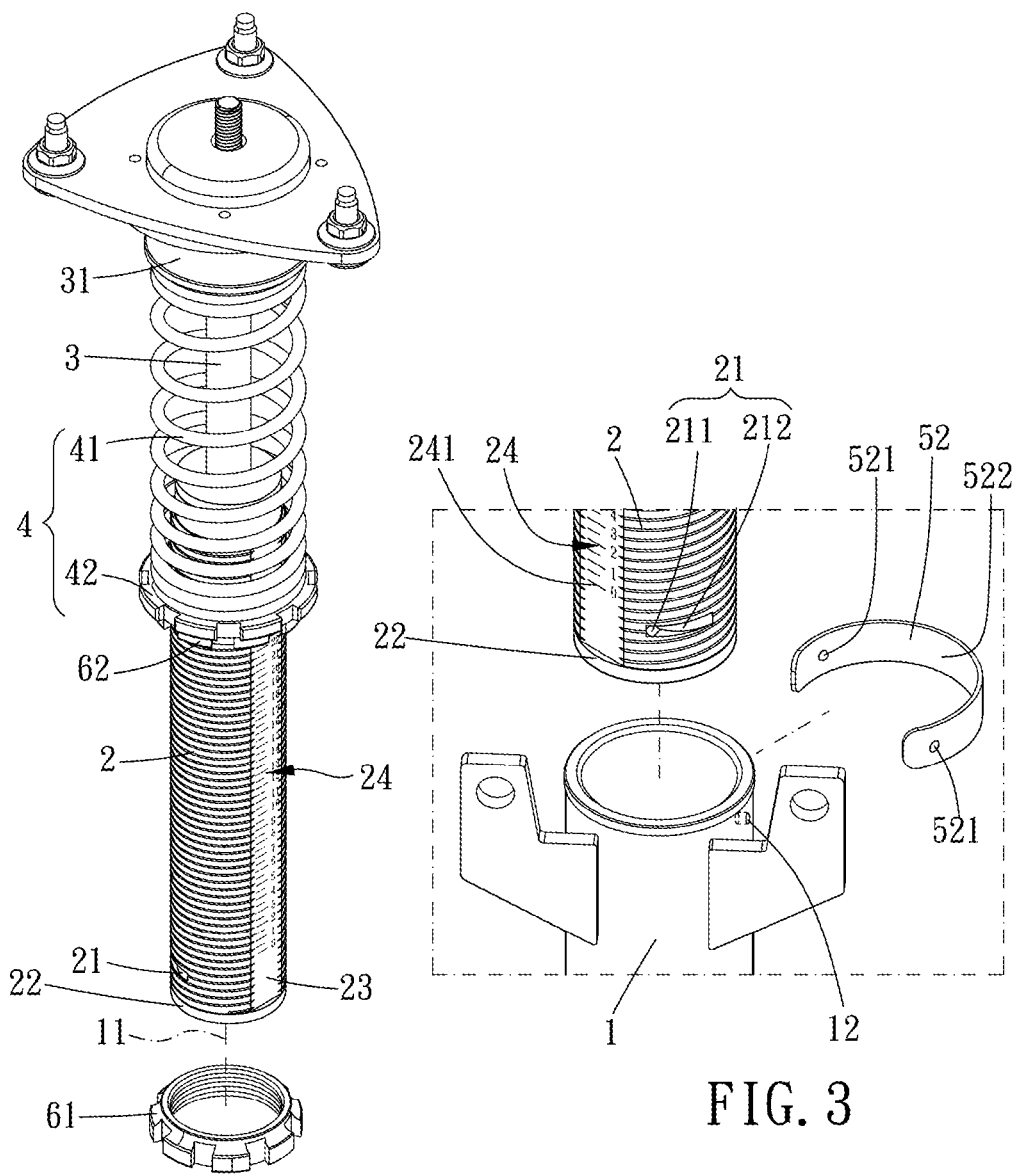
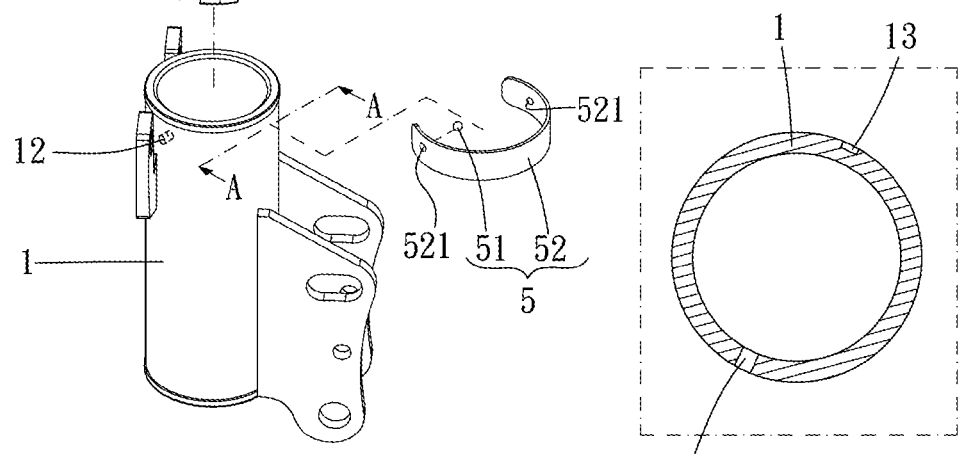
FIG. 2  FIG. 3  FIG. 4

SHOCK ABSORBER

BACKGROUND OF THE INVENTION

Field of the Invention

The present invention relates to a shock absorber, and more particularly to a shock absorber which is anti-detachment.

Description of the Prior Art

A conventional shock absorber for a vehicle as disclosed in TWM392765 includes a base, a fixed axial tube and a movable axial tube. The fixed axial tube is screwed with the base, the movable axial tube is disposed in the fixed axial tube and reciprocatable along an axial direction, and through the fixed axial tube and the base rotate relative to each other, a length of the shock absorber can be adjusted in accordance with different types of vehicles. To prevent the fixed axial tube from rotating too much and being detached from the base, a lower position-restricting ring of the conventional shock absorber which is screwed with the fixed axial tube has a through hole, a ball member, an elastic member and a fixing pin member are disposed in the through hole, and a lower end of the fixed axial tube has an annular groove. Therefore, when the fixed axial tube is rotated to make the ball member restrictably engaged within the annular groove, a user can be reminded that if s/he continues to rotate the fixed axial tube, the fixed axial tube will be detached from the base.

However, in the conventional shock absorber, the lower position-restricting ring is screwed with the fixed axial tube, so the user needs to grip on the fixed axial tube with one hand and grips on the lower position-restricting ring with the other hand so as to position the lower position-restricting ring on an end of the base to prevent the lower position-restricting ring and the fixed axial tube from moving relative to each other. Hence, the conventional shock absorber is inconvenient to be operated. In addition, the lower position-restricting ring is screwed with the fixed axial tube but not integrally connected to the base, so a distance between the lower position-restricting ring and the base may vary. The ball member being restrictably engaged in the annular groove does not mean that the fixed axial tube is about to be detached from the base, so a reminding function may have an error.

The present invention has arisen to mitigate and/or obviate the afore-described disadvantages.

SUMMARY OF THE INVENTION

The major object of the present invention is to provide a shock absorber, the shock absorber includes an abutting assembly which can effectively remind a user that a first axial tube is about to be detached from a base. In addition, the abutting assembly is easy to be assembled or disassembled and has a simple structure.

To achieve the above and other objects, a shock absorber is provided, including a base, a first axial tube, a second axial tube, a buffering structure and an abutting assembly. The base defines an axial direction, and the base has a through hole radially. An exterior circumferential wall of the first axial tube has a recess formed radially and near a first end of the base, and the first axial tube is screwed with the base. The second axial tube is disposed through the first axial tube along the axial direction and slidable relative to the first axial tube, and the second axial tube has an assembling portion. The buffering structure includes an elastic member and an adjusting ring, the adjusting ring is sleeved on the first axial tube and movable relative to the first axial tube, and the elastic member abuts against and between the assembling portion and the adjusting ring. The abutting assembly includes an abutting member and an elastic abutting member, the abutting member is disposed within the through hole, the elastic abutting member is disposed on the base and at least partly located in the through hole so as to abut the abutting member to move toward the base normally. When the first axial tube rotates relative to the base and the abutting member corresponds to the recess, the abutting member is restrictably engaged within the recess.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 2 is a breakdown view of the preferred embodiment of the present invention;

FIG. 3 is a partially-enlarged view of the preferred embodiment of the present invention;

FIG. 4 is a cross-sectional view, taken along line A-A of FIG. 2;

DETAILED DESCRIPTION OF THE PREFERRED EMBODIMENTS

Figure 1:
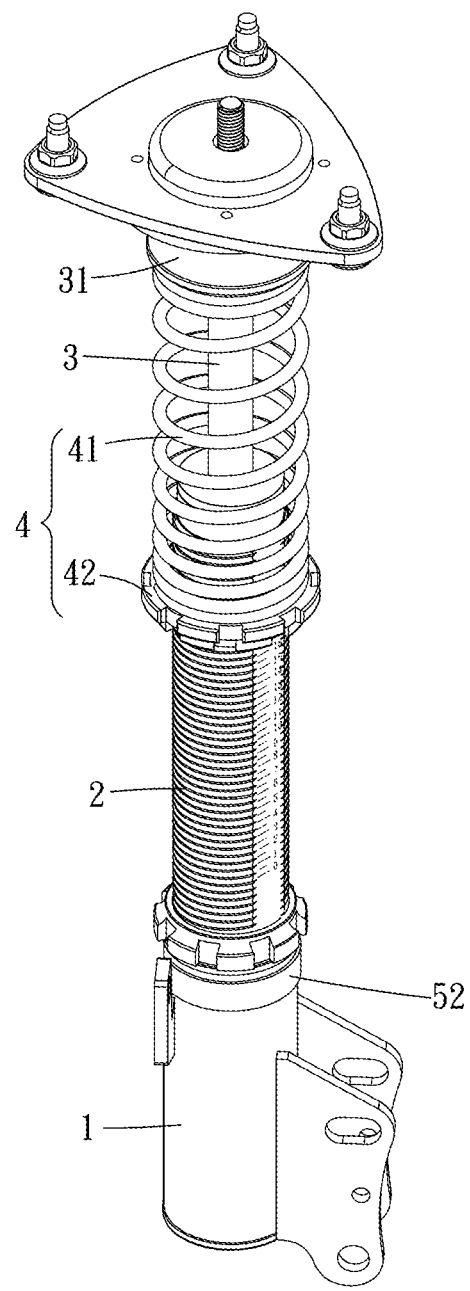
FIG. 1 is a stereogram of a preferred embodiment of the present invention.
Figure 5:
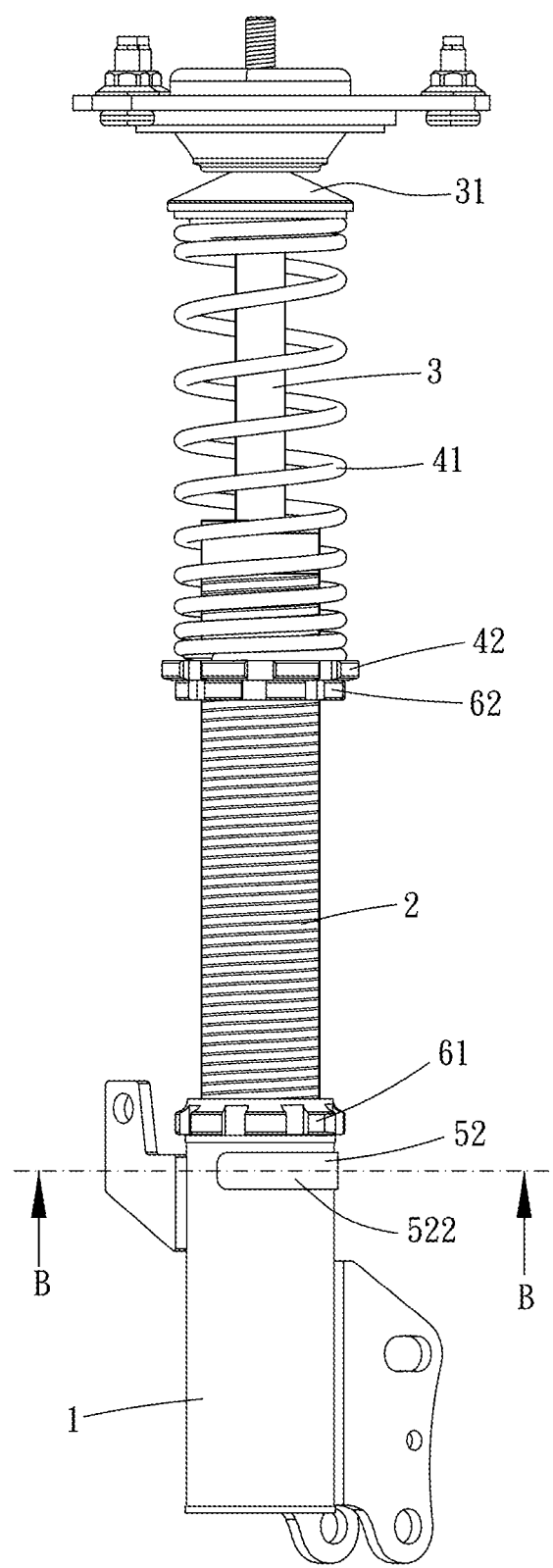
FIG. 5 is a side view of the preferred embodiment of the present invention.

The present invention will be clearer from the following description when viewed together with the accompanying drawings, which show, for purpose of illustrations only, the preferred embodiment in accordance with the present invention.

Please refer to FIGS. 1 to 7 for a preferred embodiment of the present invention. A shock absorber includes a base 1, a first axial tube 2, a second axial tube 3, a buffering structure 4 and an abutting assembly 5.

The base 1 defines an axial direction 11, and the base 1 has a through hole 12 radially.

An exterior circumferential wall of the first axial tube 2 has a recess 21 radially near a first end 22 of the base 1, and the first axial tube 2 is screwed with the base 1.

The second axial tube 3 is disposed through the first axial tube 2 along the axial direction 11 and slidable relative to the first axial tube 2, and the second axial tube 3 has an assembling portion 31. In this embodiment, the assembling portion 31 is for being assembled to a chassis of a vehicle, and the base 1 is for being assembled to a wheel seat of the vehicle. In other embodiments, the assembling portion 31 is for being assembled to the wheel seat of the vehicle, and the base 1 is for being assembled to the chassis of the vehicle.

The buffering structure 4 includes an elastic member 41 and an adjusting ring 42, the adjusting ring 42 is sleeved on the first axial tube 2 and movable relative to the first axial tube 2, and the elastic member 41 abuts against and between the assembling portion 31 and the adjusting ring 42. In this embodiment, the adjusting ring 42 is screwed with the first axial tube 2, and a user can rotate the adjusting ring 42 to adjust a tightness of the elastic member 41 in accordance with a driving requirement of the vehicle.

The abutting assembly 5 includes an abutting member 51 and an elastic abutting member 52, the abutting member 51 is disposed within the through hole 12, and the elastic abutting member 52 is disposed on the base 1 and at least partly located in the through hole 12 so as to abut the abutting member 51 to move toward the base 1 normally.

Figure 7:
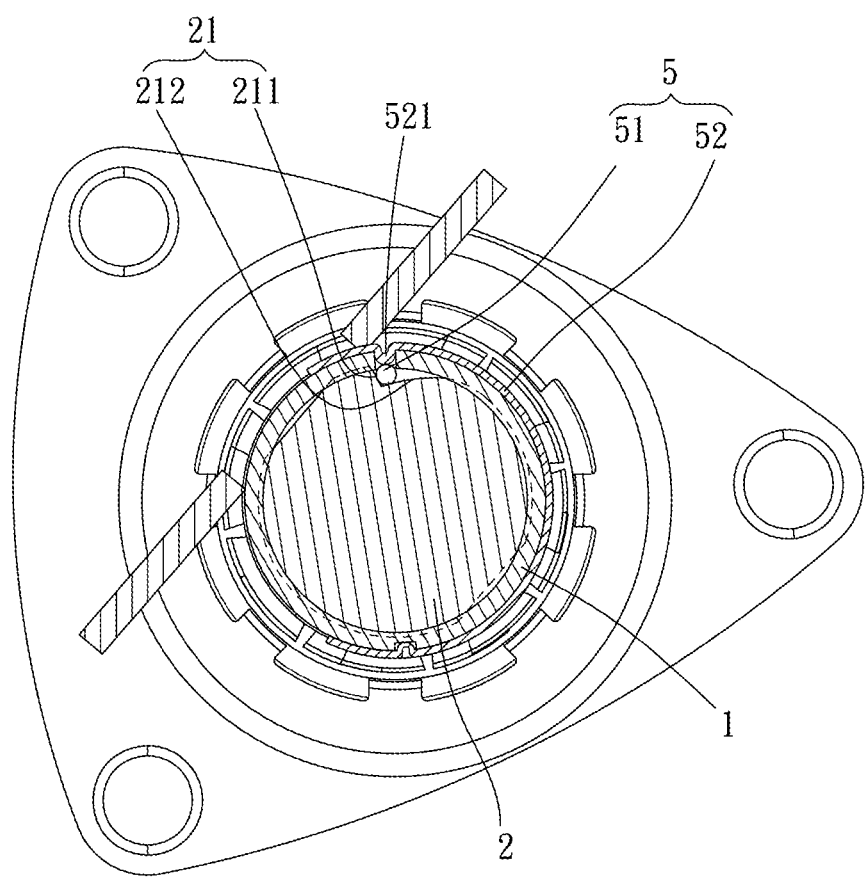

When the first axial tube 2 rotates relative to the base 1, and the abutting member 51 corresponds to the recess 21, the abutting member 51 is restrictably engaged within the recess 21. When the abutting member 51 abuts against a wall of the recess 21, the abutting member 51 clanks (as shown in FIG. 7) so as to inform the user than if s/he continues to rotate the first axial tube 2 to move away from the base 1, the first axial tube 2 will be detached from the base 1.

Specifically, in this embodiment, the elastic abutting member 52 is an elastic annular piece 522, and the elastic abutting member 52 is detachably arranged on an exterior circumferential wall of the base 1 so as to abut the abutting member 51 to move toward the base 1 normally.

Preferably, the shock absorber further includes a position-restricting ring 61 and a positioning ring 62, the position-restricting ring 61 is sleeved on the first axial tube 2 and screwed with the first axial tube 2, and the position-restricting ring 61 abuts against an end face of the base 1 along the axial direction 11 to fix the first axial tube 2 so as to prevent the first axial tube 2 and the base 1 from rotating randomly relative to each other when the vehicle is driven. The positioning ring 62 and the adjusting ring 42 are screwed with the first axial tube 2, the positioning ring 62 is located on a side of the adjusting ring 42 opposite to the elastic member 41 and abuts the adjusting ring 2 to fix the adjusting ring 42 so as to prevent the adjusting ring 42 and the first axial tube 2 from rotating randomly relative to each other when the vehicle is driven.

Figure 6:
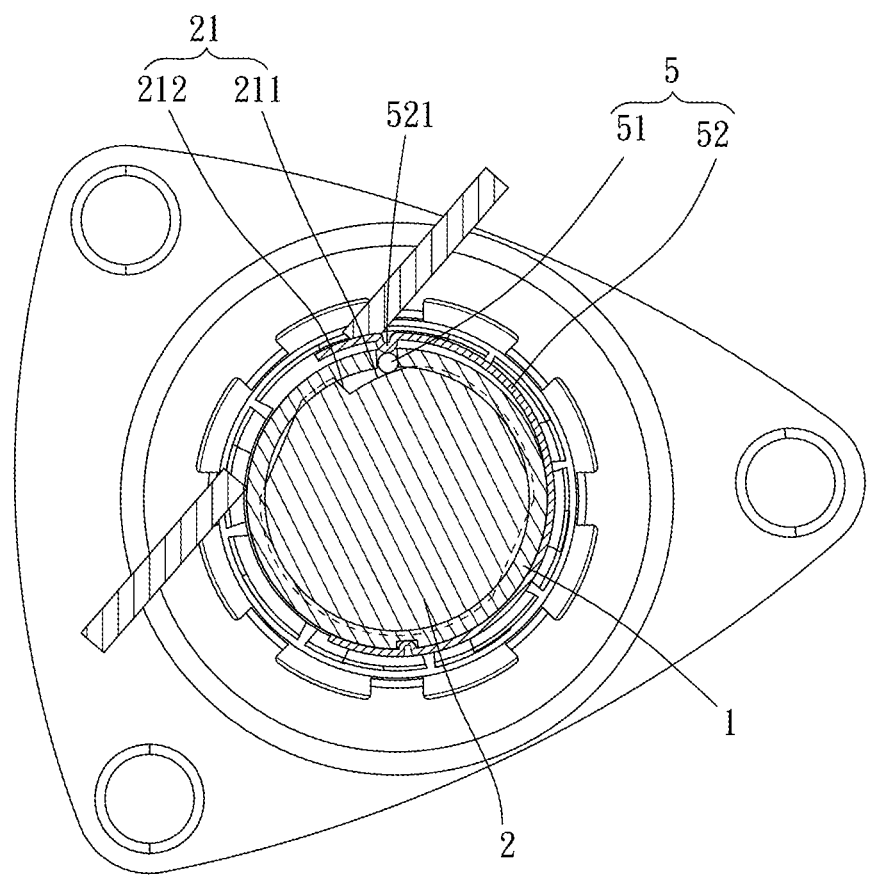
FIGS. 6 and 7 are cross-sectional views, taken along line B-B of FIG. 5, showing operation of the present invention.

Specifically, the elastic abutting member 52 is an elastic metal annular piece which is C-shaped, two opposite ends of an inner side of the elastic abutting member 52 respectively have a protrusion 521, one of the two protrusions 521 restrictably abuts against a periphery of the through hole 12 and abuts against the abutting member 51, the other of the two protrusions 521 abuts against a recessed hole 13 of the exterior circumferential wall of the base 1, and through the two protrusions 521 respectively abutting against the recessed hole 13 and the through hole 12, the elastic abutting member 52 can be fixed on the base 1. In addition, in this embodiment, when one of the two protrusions 521 abuts against the periphery of the through hole 12 and abuts against the abutting member 51, and an end of the elastic abutting member 52 near the recess 21 is bent upward slightly (as shown in FIG. 6), so it is convenient to disassemble the elastic abutting member 52. Therefore, it is convenient for the user to assemble or disassemble the abutting member 51 and the elastic abutting member 52, and when the abutting member 51 elastically abuts against the wall of the recess 21, the abutting member 51 clanks to let the user know that if s/he continues to rotate the first axial tube 2 to move away from the base 1, the first axial tube 2 will be detached from the base 1.

In this embodiment, the abutting member 51 is a ball member, one of two ends of a rotation direction of the recess 21 along the first axial rube 2 has a first inclined face 211, and the other of the two ends has a second inclined face 212. The first inclined face 211 and the second inclined face 212 have different gradients, and in this embodiment, the first inclined face 211 is greater than the second inclined face 212 in gradient. When the abutting member 51 abuts against the recess 21, and the first axial tube 2 rotates to move away from the base 1 (that is, to rotate counterclockwise), the abutting member 51 abuts against the first inclined face 211 and uneasy to be detached from the recess 21, and the user needs to apply greater force to rotate the first axial tube 2 to make the abutting member 51 slide out of the recess 21 so as to remind the user that the first axial tube 2 is about to be detached from the base 1. Preferably, a radial dimension of the abutting member 51 is greater than a greatest depth of the recess 21, and when the abutting member 51 abuts against the recess 21, the abutting member 51 partly protrudes beyond the recess 21.

In addition, the exterior circumferential wall of the first axial tube 2 has a scale 24 which extends along the axial direction 11. Preferably, a distance between an initial scale 241 of the scale 24 and the first end 22 of the first axial tube 2 is 20 mm to 40 mm, and in this embodiment, the distance is 30 mm, and the recess 21 is between the initial scale 241 of the scale 24 and the first end 22 of the first axial tube 2. The initial scale 241 is for the user to adjust a datum and can ensure that the first axial tube 2 is at least partly screwed with the base 1 so as to prevent the first axial tube 2 and the base 1 from swinging relative to each other due to unstable screwing.

In this embodiment, the exterior circumferential wall of the first axial tube 2 has two cutting sections 23 opposite to each other, the two cutting sections 23 extend along the axial direction 11, one of the two cutting sections 23 has the scale 24 which extends along the axial direction 11, the scale 24 is provided as a reference for the user to refer to when adjusting a height of a chassis so as to adjust the shock absorbers of the vehicle to reach a balance to keep the chassis of the vehicle stable.

Figure 8:
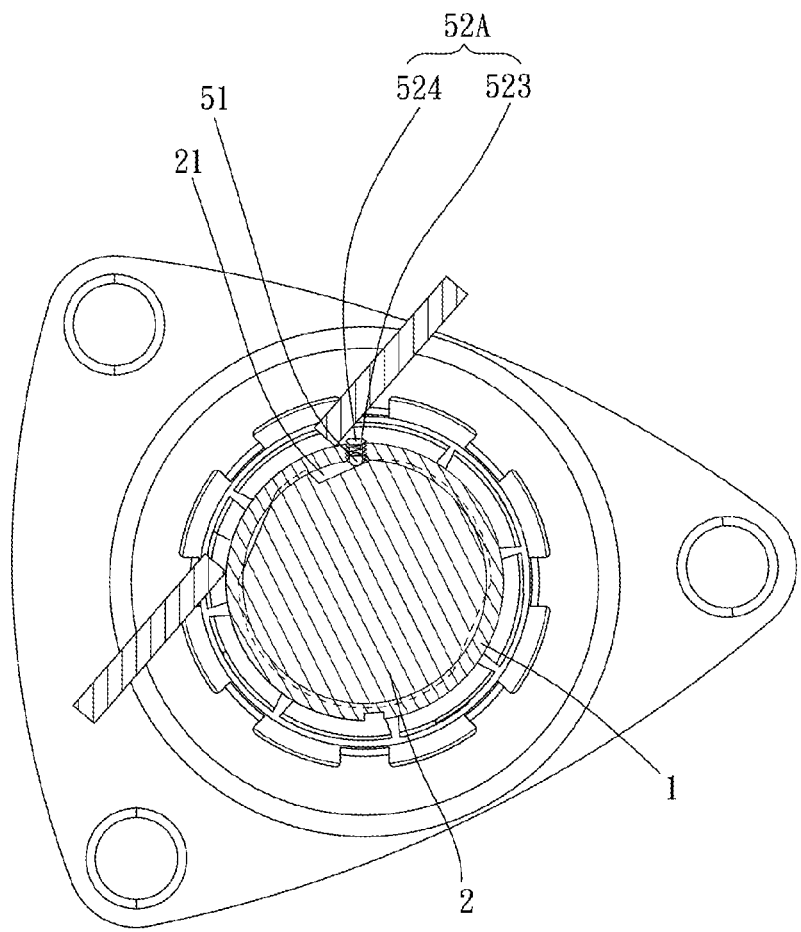
FIG. 8 is a cross-sectional top view of another preferred embodiment of the present invention.
Figure 9:
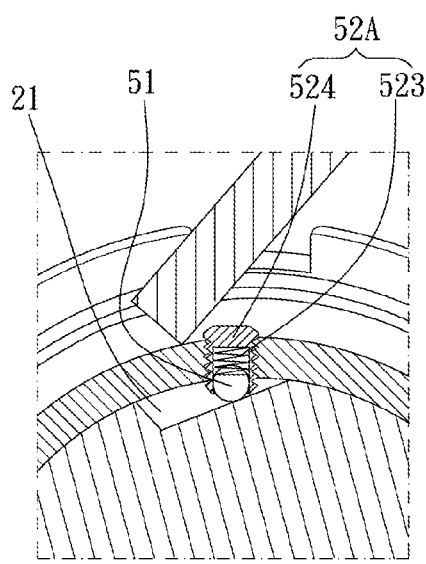
FIGS. 9 and 10 are enlarged cross-sectional view showing another preferred embodiment of the present invention in operation.
Figure 10:
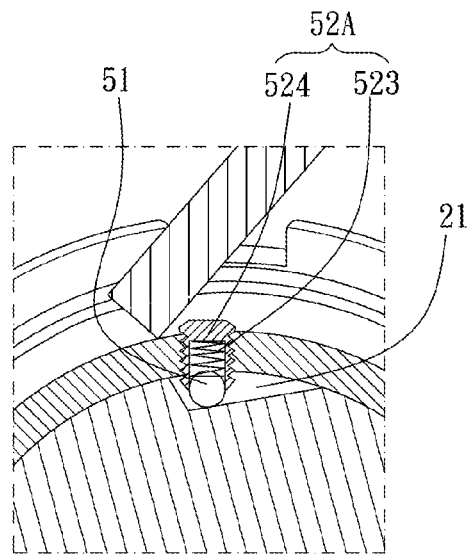

Please refer to FIGS. 8 to 10 for a second embodiment of the present invention. An elastic abutting member 52A includes a spring 523 and a pin member 524, the pin member 524 is hollow and tubular and disposed in the through hole, the spring 523 and the abutting member 51 are located in the pin member 524, and the spring 523 elastically abuts against and between the pin member 524 and the abutting member 51 so as to abut the abutting member 51 to move toward the base 1. Specifically, in this embodiment, the pin member 524 is screwed within the through hole (in other embodiments, the pin member 524 may be tightly fit into the through hole) so to be easily disassembled. Through the pin member 524 being engaged within the through hole and the spring 523 abutting the abutting member 51 to move toward the base 1, the abutting member 51 can effectively abut against the recess 21 so as to remind the user that the first axial tube 2 is about to be detached from the base 1.

Given the above, in the shock absorber, it is convenient to assemble/disassemble the abutting member and the elastic abutting member, and when the abutting member abuts against the wall of the recess, the abutting member clanks so as to inform the user that if s/he continues to rotate the first axial tube to move away from the base, the first axial tube will be detached from the base.

While we have shown and described various embodiments in accordance with the present invention, it should be clear to those skilled in the art that further embodiments may be made without departing from the scope of the present invention.

What is claimed is:

1. A shock absorber, including:
   a base, defining an axial direction, the base having a through hole radially;
   a first axial tube, an exterior circumferential wall of the first axial tube having a recess formed radially and near a first end of the base, the first axial tube screwed with the base;
   a second axial tube, disposed through the first axial tube along the axial direction and slidable relative to the first axial tube, the second axial tube having an assembling portion;
   a buffering structure, including an elastic member and an adjusting ring, the adjusting ring being sleeved on the first axial tube and movable relative to the first axial tube, the elastic member abutting against and between the assembling portion and the adjusting ring;
   an abutting assembly, including an abutting member and an elastic abutting member, the abutting member being disposed within the through hole, the elastic abutting member being disposed on the base and at least partly located in the through hole so as to abut the abutting member to move toward the base normally;
   wherein the recess intercrosses with only one single thread of the first axial tube, along a rotation direction of the first axial tube two ends of the recess face crest and root of the one single thread of the first axial tube respectively;
   one of the two ends of the recess has a first inclined face, another of the two ends has a second inclined face, the first inclined face is greater than the second inclined face in gradient, the second inclined face extends circumferentially from a bottom side of the first inclined face so that the depth of the recess decreases from the bottom side of the first inclined face to a side of the second inclined face away from the bottom side of the first inclined face;
   wherein when the first axial tube rotates relative to the base and the abutting member corresponds to the recess, the abutting member is restrictably engaged within the recess.

2. The shock absorber of claim 1, wherein the elastic abutting member is an elastic annular piece, and the elastic abutting member is detachably arranged on an exterior circumferential wall of the base so as to abut the abutting member to move toward the base normally.

3. The shock absorber of claim 2, further including a position-restricting ring, the position-restricting ring being sleeved on the first axial tube and screwed with the first axial tube, the position-restricting ring abutting against an end face of the base along the axial direction; further including a positioning ring, the positioning ring and the adjusting ring screwed with the first axial tube, the positioning ring located on a side of the adjusting ring opposite to the elastic member and abutting against the adjusting ring.

4. The shock absorber of claim 2, wherein the elastic abutting member is an elastic metal annular piece which is C-shaped, two opposite ends of an inner side of the elastic abutting member respectively have a protrusion, one of the two protrusions restrictably abuts against a periphery of the through hole and abuts against the abutting member, and the other of the two protrusions abuts against a recessed hole of the exterior circumferential wall of the base.

5. The shock absorber of claim 4, wherein the abutting member is a ball member, one of two ends of a rotation direction of the recess along the first axial rube has a first inclined face, the other of the two ends has a second inclined face, and the first inclined face and the second inclined face have different gradients.

6. The shock absorber of claim 2, wherein the abutting member is a ball member, and a radial dimension of the abutting member is greater than a greatest depth of the recess.

7. The shock absorber of claim 6, wherein the exterior circumferential wall of the first axial tube has a scale which extends along the axial direction, and a distance between an initial scale of the scale and the first end of the first axial tube is 20 mm to 40 mm.

8. The shock absorber of claim 7, wherein a position of the recess is between the initial scale of the scale and the first end of the first axial tube.

9. The shock absorber of claim 8, further including a position-restricting ring, the position-restricting ring being sleeved on the first axial tube and screwed with the first axial tube, the position-restricting ring abutting against an end face of the base along the axial direction; further including a positioning ring, the positioning ring and the adjusting ring screwed with the first axial tube, the positioning ring located on a side of the adjusting ring opposite to the elastic member and abutting against the adjusting ring; the elastic abutting member being an elastic metal annular piece which is C-shaped, two opposite ends of an inner side of the elastic abutting member respectively having a protrusion, one of the two protrusions restrictably abutting against a periphery of the through hole and abutting against the abutting member, and the other of the two protrusions abutting against a recessed hole of the exterior circumferential wall of the base; the abutting member being a ball member, one of two ends of a rotation direction of the recess along the first axial rube having a first inclined face, the other of the two ends having a second inclined face; the first inclined face and the second inclined face having different gradients.

10. The shock absorber of claim 1, wherein the elastic abutting member includes a spring and a pin member, the pin member is hollow and tubular and disposed in the through hole, the spring and the abutting member are located in the pin member, and the spring elastically abuts against and between the pin member and the abutting member so as to abut the abutting member to move toward the base.

\* \* \* \* \*